UNITED STATES PATENT OFFICE.

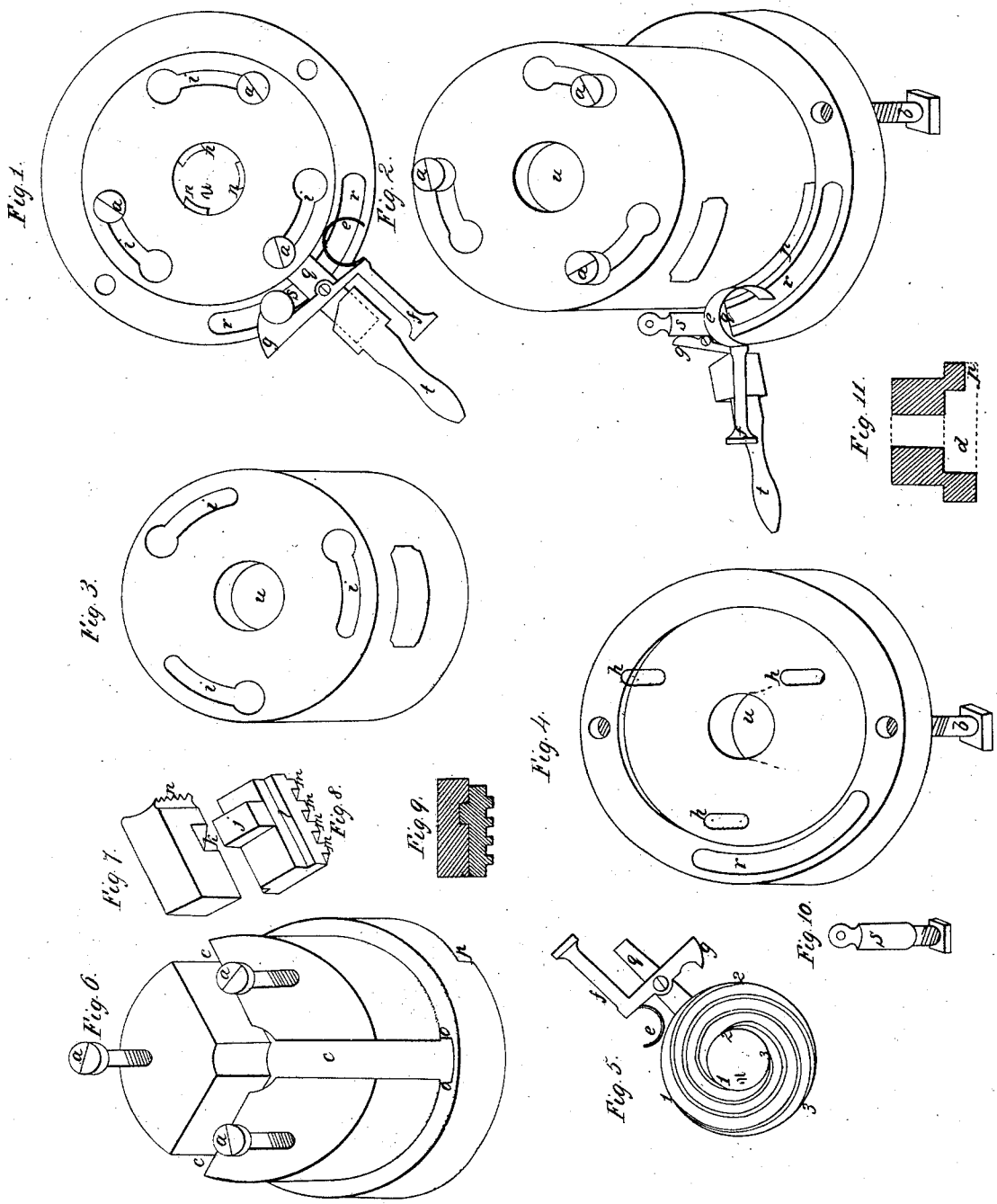

RICHARD NUTTALL AND JOHN KIRKPATRICK, OF ALLEGHENY, PENNSYLVANIA.

CHUCK FOR SCREW-CUTTING.

Specification of Letters Patent No. 20,168, dated May 4, 1858.

*To all whom it may concern:*

Be it known that we, RICHARD NUTTALL and JOHN KIRKPATRICK, of the city and county of Allegheny, in the State of Pennsylvania, have invented certain new and useful Improvements in Chucks for Screw-Cutting; and we do hereby declare that the following is a full and exact description thereof, reference being had to the accompanying drawings and to letters of reference marked thereon, similar letters referring to similar parts.

The nature of our invention consists in an arrangement for moving the cutting dies backward and forward in their chambers by means of a troll plate having three scroll-formed grooves and die seats with segments fitted to said grooves, the cutting dies being so arranged that they can be readily removed and replaced by others, and also in an arrangement for holding the cutting dies in their chambers, and in the manner of relieving them from the upward or outward pressure of troll plate and die seats.

To enable others skilled in the art to make and use our invention, we will proceed to describe its construction and operation.

In the accompanying drawings Figure 1, is a top view of the chuck. Fig. 2, is a perspective view of the chuck. Fig. 3, represents a cap used for holding the cutting dies to their seat. Fig. 4, represents the base plate. Fig. 5, represents the troll plate and spring-claw. Fig. 6, represents the receiving chest. Fig. 7 represents one of cutting dies. Fig. 8, represents the die seat. Fig. 9, is a cut view of the cutting die and its seat. Fig. 10, represents the set-stud. Fig. 11, is a cut-view of the receiving chest.

In the accompanying drawings (*a*) are three bolts used for the purpose of holding the cap to its place.

(*b*) are two bolts used for the purpose of holding the chuck to its place on the lathe.

(*c*) are the chambers for the cutting dies and die seats.

(*d*) is a chamber for the troll plate.

(*f*) is the handle used for relieving the spring claw (*g*). The spring claw and its parts are secured to the lever (*q*).

(*h*) are three bolts used for the purpose of securing the receiving chest to the base plate.

(*i*) are three slots made in the face of the cap. Each of these slots are made large enough at one end to allow the heads of the bolts (*a*) to pass through.

(*j*) is a projection on the upper face of the die seat used for the purpose of operating the cutting dies.

(*k*) is a transverse slot made in the cutting dies. This slot or notch is made to fit the projection (*j*) on the die seat, which is clearly shown in Fig. 9. By this arrangement of the projection (*j*) and slot (*k*) in connection with the cap shown in Fig. 3, the cutting dies can be removed and replaced by others with great ease and speed.

(*l*) are two tongues one on each side of the die seat. These tongues are made to fit the grooves marked (*o*) seen in the receiving chest. By this arrangement of the grooves (*o*) and tongues (*l*) the upward or outward pressure of the troll plate and die seats is taken off the cutting dies.

(*m*) are segments of a circle placed on the under surface of the die seat. These segments are fitted to the grooves which are made in the troll plate. The grooves (1, 2 and 3) in the troll plate and the segments (*m, m, m, m*) on the die seats are so arranged as to require but a slight movement of the lever to throw the cutting dies into or out from the work, one revolution of the lever being sufficient to run the full length of the grooves, or in other words, one revolution of the troll plate is sufficient to throw the cutting dies out or in equal to one third the diameter of the troll plate.

(*n*) are the chasers on the cutting edge of the cutting dies.

(*p*) is a recess made in the flange of the receiving chest for the purpose of making room for the lever used in operating the troll plate.

(*r*) is a groove or slot made in the base plate for the purpose of receiving the set-stud, which can be moved backward and forward in the slot and held to the place desired by means of the nut on the end of the stud.

(*s*) is the set-stud used for the purpose of regulating the motion of the lever (*q*).

(*t*) is a socket handle used for giving length to the lever (*q*) it being necessary to make the lever short when the chuck is placed on the running head of the lathe.

(*u*) are the openings used for the purpose of admitting the bolt or thing to be cut. The opening in the base plate is made bell mouthed (which is shown by red and dotted lines see Fig. 4) for the purpose of allowing the cuttings to drop out, thereby keeping the cutting dies clean.

Having the various parts made and prepared as shown in the accompanying drawings, we arrange them in the following manner: We place the troll plate upon the base plate. We then insert the die seats in their place in the receiving chest. We then place the receiving chest over the troll plate and secure it to the base plate by means of the bolts ($h$). We then place the cutting dies in their chambers ($c$). We then place the cap on the receiving chest and we secure it to its place by means of the bolts ($a$).

Having all the parts arranged in their proper place as clearly shown in Figs. 1 and 2, our chuck is ready for use.

It will be observed that by our arrangement of the spring-claw and set-stud the cutting dies are held firmly to the work, thereby securing an even screw or bolt, and one chuck will answer for various sizes of bolts or screws, it being only necessary to change the cutting dies where a change of thread is desired, and this changing of the cutting dies is accomplished with great speed and ease by means of the removable cutting die and cap. It will also be observed that our chuck can be used on either the running or stationary head of the lathe and can be applied to any of the ordinary machines used for screw cutting, and one chuck will answer for any number of cutting dies, thereby saving expense in machinery and a gain of speed and ease, and a saving of time, labor and expense in this branch of business, viz. screw cutting.

Having thus described the nature, construction and operation of our improvement in chucks for screw cutting, what we claim as our invention and desire to secure by Letters Patent of the United States is—

1. The projection ($j$) on the movable die seats, and the transverse slot or notch ($k$) in the removable cutting dies, the one being adapted to the other as herein described and for the purpose set forth.

2. The use of the troll plate when constructed as specified and operating in connection with the die-seat and die as set forth.

RICHARD NUTTALL.
JOHN KIRKPATRICK.

Witnesses:
ALEXANDER HAYS,
GEORGE I. STECK.